United States Patent
Ahuja et al.

(10) Patent No.: US 11,297,116 B2
(45) Date of Patent: Apr. 5, 2022

(54) HYBRID STREAMING

(71) Applicant: Roblox Corporation, San Mateo, CA (US)

(72) Inventors: Chetan Ahuja, Burlingame, CA (US); Daniel G. Gelb, Redwood City, CA (US); Angelo Pesce, San Mateo, CA (US); Adam Miller, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 0 days.

(21) Appl. No.: 16/703,824

(22) Filed: Dec. 4, 2019

(65) Prior Publication Data

US 2021/0176288 A1 Jun. 10, 2021

(51) Int. Cl.
| | |
|---|---|
| *H04L 29/06* | (2006.01) |
| *H04L 65/611* | (2022.01) |
| *H04L 65/60* | (2022.01) |
| *H04N 13/117* | (2018.01) |
| *G06T 15/20* | (2011.01) |
| *A63F 13/355* | (2014.01) |

(52) U.S. Cl.
CPC ........ *H04L 65/4076* (2013.01); *A63F 13/355* (2014.09); *G06T 15/205* (2013.01); *H04L 65/604* (2013.01); *H04N 13/117* (2018.05)

(58) Field of Classification Search
CPC . H04L 65/4076; H04L 65/604; H04N 13/117; G06T 15/205; A63F 13/355
See application file for complete search history.

(56) References Cited

U.S. PATENT DOCUMENTS

| | | | |
|---|---|---|---|
| 6,266,068 B1* | 7/2001 | Kang | G06T 11/60 345/422 |
| 8,872,813 B2 | 10/2014 | Walton et al. | |
| 9,686,520 B2 | 6/2017 | Chu et al. | |
| 10,341,632 B2* | 7/2019 | Pang | H04N 13/156 |
| 10,419,716 B1* | 9/2019 | Tanumihardja | G09B 19/003 |
| 2001/0043738 A1* | 11/2001 | Sawhney | G01S 5/163 382/154 |
| 2011/0242277 A1* | 10/2011 | Do | G06T 7/90 348/43 |
| 2011/0249090 A1* | 10/2011 | Moore | G06T 19/006 348/43 |

(Continued)

OTHER PUBLICATIONS

PCT, "International Search Report and Written Opinion in International Application No. PCT/US2019/065097", dated Feb. 12, 2020, 9 pages.

*Primary Examiner* — Ario Etienne
*Assistant Examiner* — Kidest Mendaye
(74) *Attorney, Agent, or Firm* — IP Spring

(57) ABSTRACT

A method and system are provided for hybrid streaming of media content such as video for a computer-based game. In some implementations, a background media content stream includes a background video rendered on a server. The background media content stream is received at a client device. The client device renders one or more three-dimensional objects and forms a composite media stream by combining the background media content stream and the one or more three-dimensional objects. The composite media stream can be output to a display or other external system.

18 Claims, 9 Drawing Sheets

(56) References Cited

U.S. PATENT DOCUMENTS

| | | | | |
|---|---|---|---|---|
| 2012/0120200 A1* | 5/2012 | Newton | ................. | H04N 13/10 348/46 |
| 2013/0127826 A1* | 5/2013 | Walton | ................... | G06T 19/20 345/419 |
| 2014/0071151 A1* | 3/2014 | Oesterreicher | ......... | G06T 11/40 345/589 |
| 2014/0146046 A1* | 5/2014 | Coombe | ................. | G06T 17/00 345/423 |
| 2014/0179421 A1* | 6/2014 | Quinn | ..................... | A63F 13/00 463/31 |
| 2014/0292803 A1* | 10/2014 | Cook | ................... | A63F 13/355 345/619 |
| 2016/0217760 A1* | 7/2016 | Chu | ..................... | H04N 13/279 |
| 2016/0225157 A1* | 8/2016 | Yuan | ..................... | G06T 15/005 |
| 2018/0270464 A1* | 9/2018 | Harviainen | ........... | H04N 13/128 |
| 2019/0080498 A1* | 3/2019 | Horie | ............... | H04N 5/232935 |
| 2019/0147661 A1* | 5/2019 | Gervasio | ............. | H04N 21/816 345/426 |
| 2019/0355172 A1* | 11/2019 | Dsouza | .................. | G06T 17/00 |

\* cited by examiner

HYBRID STREAMING

TECHNICAL FIELD

Embodiments relate generally to interactive media systems, and more particularly but not exclusively, to methods, systems and computer readable media for hybrid streaming of media content such as computer-generated video.

BACKGROUND

Some interactive media systems, such as online gaming, involve a client-server architecture in which a server may have computing power for rendering, but may be subject to a lag (or time delay) due to network connection and a client device which may have no lag, but lack the computing resources of the server.

Some computer-based games include video having a three-dimensional appearance, where the video includes background imagery and one or more foreground objects rendered in three-dimensions. A need may exist for computing resources to perform rendering, while being responsive to changes in foreground objects to present movement without lag. Some implementations were conceived in light of the above-mentioned needs, among other things.

SUMMARY

Some implementations can include a method. The method can include receiving, at a client device, background video that corresponds to a background portion of a virtual environment as viewed from a particular vantage point associated with the client device, wherein the background video is rendered on a server, and rendering, using the client device, one or more rendered objects that are at least partially in a foreground portion of the virtual environment. The method can also include combining, using the client device, at least a portion of the background video and at least one of the one or more rendered objects into a composite video, and outputting the composite video.

In some implementations, the background video can include a panoramic view of the virtual environment near a position of the particular vantage point associated with the client device. In some implementations, the background video includes color map information to map a three-dimensional scene.

The method can also include receiving, from the server, supplemental data corresponding to the background video. In some implementations, the supplemental data can include data from one or more of depth buffers or three-dimensional geometry information. In some implementations, the combining can include overlaying the one or more rendered objects on top of the background video, and the method can further include using depth and geometry information to determine portions of the background video that are in front of the one or more rendered objects or behind the one or more rendered objects. In some implementations, the combining can include using depth in geometry information to match a current viewpoint.

In some implementations, the combining can include generating a parallax effect using a plurality of layers of panoramic images corresponding to respective different distances. In some implementations, generating the composite video includes using depth information to determine placement of the one or more rendered objects relative to one or more locations in the background video.

Some implementations can include a device to perform hybrid video streaming, the device can include one or more processors and a memory coupled to the one or more processors, with instructions stored thereon that, when executed by the one or more processors to perform operations. The operations can include receiving, at a client device, background video that corresponds to a background portion of a virtual environment as viewed from a particular vantage point associated with the client device, wherein the background video is rendered on a server, and rendering, using the client device, one or more rendered objects that are at least partially in a foreground portion of the virtual environment. The operations can also include combining, using the client device, at least a portion of the background video and at least one of the one or more rendered objects into a composite video, and outputting the composite video.

In some implementations, the background video can include a panoramic view of the virtual environment near a position of the particular vantage point associated with the client device. In some implementations, the background video includes color map information to map a three-dimensional scene.

The operations can also include receiving, from the server, supplemental data corresponding to the background video. In some implementations, the supplemental data can include data from one or more of depth buffers or three-dimensional geometry information. In some implementations, the combining can include overlaying the one or more rendered objects on top of the background video, and the operations can further include using depth and geometry information to determine portions of the background video that are in front of the one or more rendered objects or behind the one or more rendered objects. In some implementations, the combining can include using depth in geometry information to match a current viewpoint.

In some implementations, the combining can include generating a parallax effect using a plurality of layers of panoramic images corresponding to respective different distances. In some implementations, generating the composite video includes using depth information to determine placement of the one or more rendered objects relative to one or more locations in the background video.

Some implementations can include a non-transitory computer-readable medium comprising instructions that, responsive to execution by a processing device, cause the processing device to perform operations. The operations can include receiving, at a client device, background video that corresponds to a background portion of a virtual environment as viewed from a particular vantage point associated with the client device, wherein the background video is rendered on a server, and rendering, using the client device, one or more rendered objects that are at least partially in a foreground portion of the virtual environment. The operations can also include combining, using the client device, at least a portion of the background video and at least one of the one or more rendered objects into a composite video, and outputting the composite video.

In some implementations, the background video can include a panoramic view of the virtual environment near a position of the particular vantage point associated with the client device. In some implementations, the background video includes color map information to map a three-dimensional scene.

The operations can also include receiving, from the server, supplemental data corresponding to the background video. In some implementations, the supplemental data can include data from one or more of depth buffers or three-dimensional geometry information. In some implementations, the combining can include overlaying the one or more rendered objects on top of the background video, and the operations can further include using depth and geometry information to determine portions of the background video that are in front of the one or more rendered objects or behind the one or more rendered objects. In some implementations, the combining can include using depth in geometry information to match a current viewpoint.

In some implementations, the combining can include generating a parallax effect using a plurality of layers of panoramic images corresponding to respective different distances. In some implementations, generating the composite video includes using depth information to determine placement of the one or more rendered objects relative to one or more locations in the background video.

DETAILED DESCRIPTION

Figure 1:
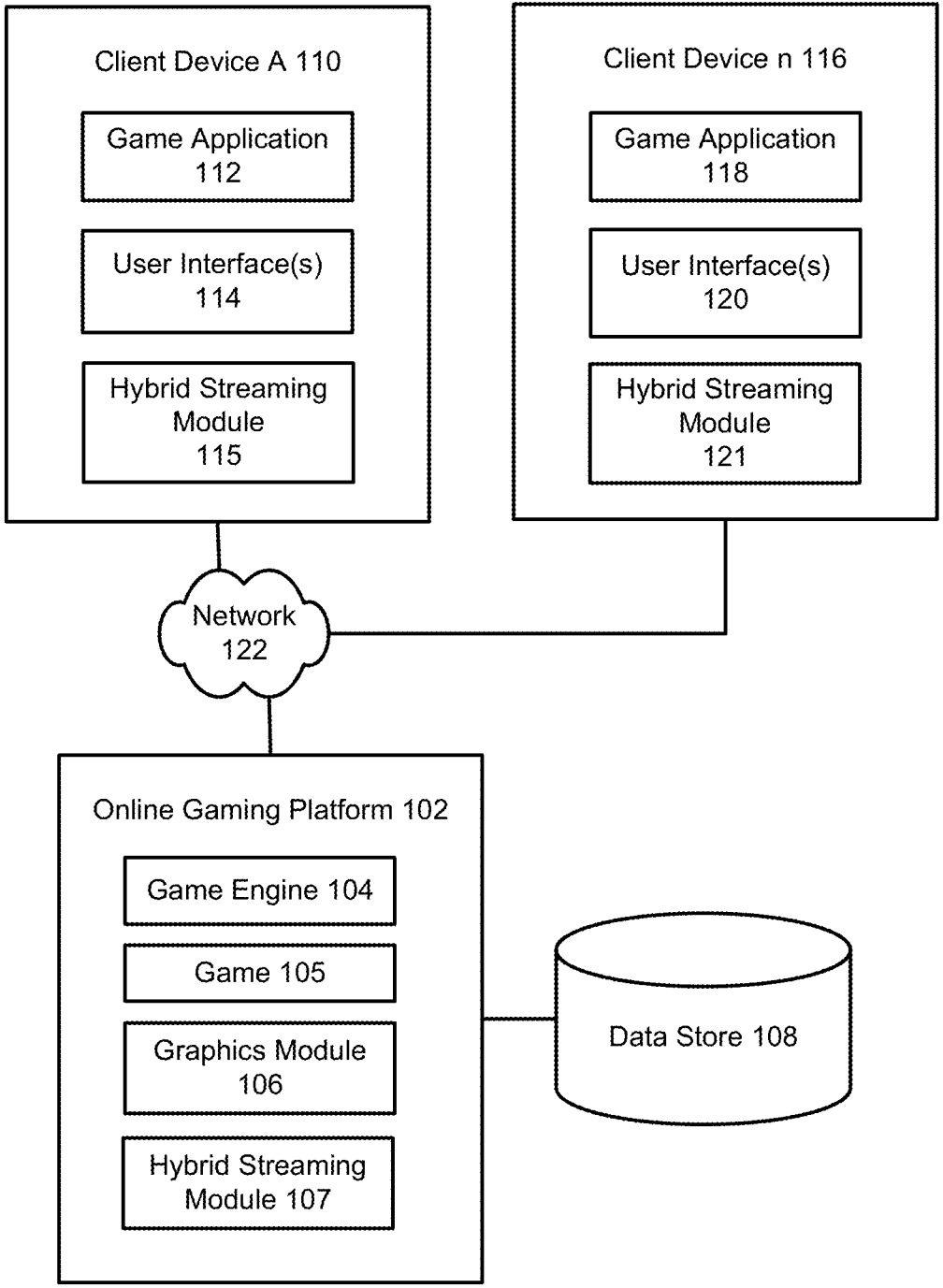
FIG. 1 is a diagram of an example system architecture for online gaming in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

Interactive media applications or systems, such as online gaming platforms (which can include "user-generated content platforms" or "user-generated content systems"), can offer a variety of ways for users to interact with one another. For example, users of an online gaming platform may work together towards a common goal, share various virtual gaming items, send electronic messages to one another, and so forth. Users of an online gaming platform may play games using characters.

An online gaming platform may also allow users of the platform to create and animate new characters and avatars. For example, users of the online gaming platform may be allowed to create, design, and customize new characters.

FIG. 1: System Architecture

FIG. 1 illustrates an example system architecture 100, in accordance with some implementations of the disclosure. The system architecture 100 (also referred to as "system" herein) includes an online gaming platform 102, a first client device 110 (generally referred to as "client device(s) 110" herein), a network 122, and at least one second client device 116. The online gaming platform 102 can include, among other things, a game engine 104, one or more games 105, a graphics module 106, a hybrid streaming module 107, and a data store 108. The client device 110 can include a game application 112, user interfaces 114 (e.g., audio/video input/output devices), and a hybrid streaming module 115. The client device 116 can include a game application 118, user interfaces 120 (e.g., audio/video input/output devices), and a hybrid streaming module 121. The hybrid streaming modules 115 and 1212 can be separate or integrated with the game application (112 and 118, respectively). The hybrid streaming module 107 in the online gaming platform 102 can be a separate module or can be incorporated into another module such as the graphics module 106. The audio/video input/output devices can include one or more of microphones, speakers, headphones, display device, etc.

System architecture 100 is provided for illustration, rather than limitation. In some implementations, the system architecture 100 may include the same, fewer, more, or different elements configured in the same or different manner as that shown in FIG. 1.

In one implementation, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In one implementation, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online gaming platform 102 can include a server having one or more computing devices (e.g., a cloud computing system, a rackmount server, a server computer, cluster of physical servers, etc.). In some implementations, a server may be included in the online gaming platform 102, be an independent system, or be part of another system or platform.

In some implementations, the online gaming platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming platform 102 and to provide a user with access to online gaming platform 102. The online gaming platform 102 may also include a website (e.g., a webpage) or application back-end software that may be used to provide a user with access to content provided by online gaming platform 102. For example, users may access online gaming platform 102 using the game application 112 on client devices 110.

In some implementations, online gaming platform 102 may include a type of social network providing connections between users or a type of user-generated content system that allows users (e.g., end-users or consumers) to communicate with other users on the online gaming platform 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming platform 102 may be a virtual gaming platform. For example, the gaming platform may provide single-player or multiplayer games to a community of users that may access or interact with games using client devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to interaction of one or more players using client devices (e.g., 110 and/or 116) within a game (e.g., 105) or the presentation of the interaction on a display or other user interfaces (e.g., 114/120) of a client device 110 or 116.

In some implementations, a game 105 can include an electronic file that can be executed or loaded using software, firmware or hardware configured to present the game content (e.g., digital media item) to an entity. In some implementations, a game application 112 may be executed and a game 105 rendered in connection with a game engine 104. In some implementations, a game 105 may have a common set of rules or common goal, and the environments of a game 105 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game application 105 may be collectively referred to a "world" or "gaming world" or "virtual world" or "universe" herein. An example of a world may be a 3D world of a game 105. For example, a user may build a virtual environment that is linked to another virtual environment created by another user. A character of the virtual game may cross the virtual border to enter the adjacent virtual environment.

It may be noted that 3D environments or 3D worlds use graphics that provide a three-dimensional representation of geometric data representative of game content (or at least present game content to appear as 3D content whether or not 3D representation of geometric data is used). 2D environments or 2D worlds use graphics that provide two-dimensional representation of geometric data representative of game content.

In some implementations, the online gaming platform 102 can host one or more games 105 and can permit users to interact with the games 105 using a game application 112 of client devices 110. Users of the online gaming platform 102 may play, create, interact with, or build games 105, communicate with other users, and/or create and build objects (e.g., also referred to as "item(s)" or "game objects" or "virtual game item(s)" herein) of games 105. For example, in generating user-generated virtual items, users may create characters, animation for the characters, decoration for the characters, one or more virtual environments for an interactive game, or build structures used in a game 105, among others. In some implementations, users may buy, sell, or trade game virtual game objects, such as in-platform currency (e.g., virtual currency), with other users of the online gaming platform 102. In some implementations, online gaming platform 102 may transmit game content to game applications (e.g., 112). In some implementations, game content (also referred to as "content" herein) may refer to any data or software instructions (e.g., game objects, game, user information, video, images, commands, media item, etc.) associated with online gaming platform 102 or game applications. In some implementations, game objects (e.g., also referred to as "item(s)" or "objects" or "virtual game item(s)" herein) may refer to objects that are used, created, shared or otherwise depicted in game applications 105 of the online gaming platform 102 or game applications 112 or 118 of the client devices 110/116. For example, game objects may include a part, model, character or components thereof (like faces, arms, lips, etc.), tools, weapons, clothing, buildings, vehicles, currency, flora, fauna, components of the aforementioned (e.g., windows of a building), and so forth.

It may be noted that the online gaming platform 102 hosting games 105, is provided for purposes of illustration, rather than limitation. In some implementations, online gaming platform 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 105 may be associated with a particular user or a particular group of users (e.g., a private game), or made widely available to users of the online gaming platform 102 (e.g., a public game). In some implementations, where online gaming platform 102 associates one or more games 105 with a specific user or group of users, online gaming platform 102 may associate the specific user(s) with a game 102 using user account information (e.g., a user account identifier such as username and password).

In some implementations, online gaming platform 102 or client devices 110 may include a game engine 104 or game application 112/118. In some implementations, game engine 104 may be used for the development or execution of games 105. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, animation commands, physics commands, etc.) In some implementations, game applications 112/118 of client devices 110/116, respectively, may work independently, in collaboration with game engine 104 of online gaming platform 102, or a combination of both.

In some implementations, both the online gaming platform 102 and client devices 110/116 execute a game engine (104, 112, 118, respectively). The online gaming platform 102 using game engine 104 may perform some or all the game engine functions (e.g., generate physics commands, animation commands, rendering commands, etc.), or offload some or all the game engine functions to game engine 104 of client device 110. In some implementations, each game 105 may have a different ratio between the game engine functions that are performed on the online gaming platform 102 and the game engine functions that are performed on the client devices 110 and 116. For example, the game engine 104 of the online gaming platform 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming platform 102 and client device 110 may be changed (e.g., dynamically) based on gameplay conditions. For example, if the number of users participating in gameplay of a particular game 105 exceeds a threshold number, the online gaming platform 102 may perform one or more game engine functions that were previously performed by the client devices 110 or 116.

For example, users may be playing a game 105 on client devices 110 and 116, and may send control instructions (e.g., user inputs, such as right, left, up, down, user election, or character position and velocity information, etc.) to the online gaming platform 102. Subsequent to receiving control instructions from the client devices 110 and 116, the online gaming platform 102 may send gameplay instructions (e.g., position and velocity information of the characters participating in the group gameplay or commands, such as rendering commands, collision commands, etc.) to the client devices 110 and 116 based on control instructions. For instance, the online gaming platform 102 may perform one or more logical operations (e.g., using game engine 104) on the control instructions to generate gameplay instruction for the client devices 110 and 116. In other instances, online gaming platform 102 may pass one or more or the control instructions from one client device 110 to other client devices (e.g., 116) participating in the game 105. The client devices 110 and 116 may use the gameplay instructions and render the gameplay for presentation on the displays of client devices 110 and 116.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming platform 102. In other implementations, the control instructions may be sent from a client device 110 to another client device (e.g., 116), where the other client device generates gameplay instructions using the local game engine 104. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that allow a client device 110 (or 116) to render gameplay of a game, such as a multiplayer game. The gameplay instructions may include one or more of user input (e.g., control instructions), character position and velocity information, or commands (e.g., physics commands, animation commands, rendering commands, collision commands, etc.).

In some implementations, characters (or game objects generally) are constructed from components, one or more of which may be selected by the user, that automatically join together to aid the user in editing. One or more characters (also referred to as an "avatar" or "model" herein) may be associated with a user where the user may control the character to facilitate a user's interaction with the game 105. In some implementations, a character may include components such as body parts (e.g., hair, arms, legs, etc., which can be animated) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools. In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online gaming platform 102. In some implementations, creating, modifying, or customizing characters, other game objects, games 105, or game environments may be performed by a user using a user interface (e.g., developer interface) and with or without scripting (or with or without an application programming interface (API)). It may be noted that for purposes of illustration, rather than limitation, characters are described as having a humanoid form. In may further be noted that characters may have any form such as a vehicle, animal, inanimate object, or other creative form.

In some implementations, the online gaming platform 102 may store characters created by users in the data store 108. In some implementations, the online gaming platform 102 maintains a character catalog and game catalog that may be presented to users via. In some implementations, the game catalog includes images of games stored on the online gaming platform 102. In addition, a user may select a character (e.g., a character created by the user or other user) from the character catalog to participate in the chosen game. The character catalog includes images of characters stored on the online gaming platform 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming platform 102.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." In some implementations, one or more client devices 110 or 116 may connect to the online gaming platform 102 at any given moment. It may be noted that the number of client devices 110 or 116 is provided as illustration, rather than limitation. In some implementations, any number of client devices 110 or 116 may be used.

In some implementations, each client device 110 or 116 may include an instance of the game application 112 or 118, respectively. In one implementation, the game application 112 or 118 may permit users to use and interact with online gaming platform 102, such as control a virtual character in a virtual game hosted by online gaming platform 102, or view or upload content, such as games 105, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 or 116 and allows users to interact with online gaming platform 102. The game application may render, display, or present the content (e.g., a web page, a media viewer) to a user (e.g., via the hybrid streaming modules 115 and 121 in conjunction with the platform hybrid streaming module 107). In an implementation, the game application may also include an embedded media player (e.g., a Flash® player) that is embedded in a web page.

According to aspects of the disclosure, the game application may be an online gaming platform application for users to build, create, edit, upload content to the online gaming platform 102 as well as interact with online gaming platform 102 (e.g., play games 105 hosted by online gaming platform 102). As such, the game application may be provided to the client device 110 or 116 by the online gaming platform 102. In another example, the game application may be an application that is downloaded from a server.

In some implementations, a user may login to online gaming platform 102 via the game application. The user may access a user account by providing user account information (e.g., username and password) where the user account is associated with one or more characters available to participate in one or more games 105 of online gaming platform 102.

In general, functions described in one implementation as being performed by the online gaming platform 102 can also be performed by the client device(s) 110 or 116, or a server, in other implementations if appropriate. In addition, the functionality attributed to a particular component can be performed by different or multiple components operating together. The online gaming platform 102 can also be accessed as a service provided to other systems or devices through appropriate application programming interfaces (APIs), and thus is not limited to use in websites.

In some implementations, online gaming platform 102 may include a graphics module 106. In some implementations, the graphics module 106 may be a system, application, or module that permits the online gaming platform 102 to provide graphics and animation capability. In some implementations, the graphics module 106 may perform one or more of the operations described below in connection with the flowcharts shown in FIG. 3 or 4.

Figure 2:
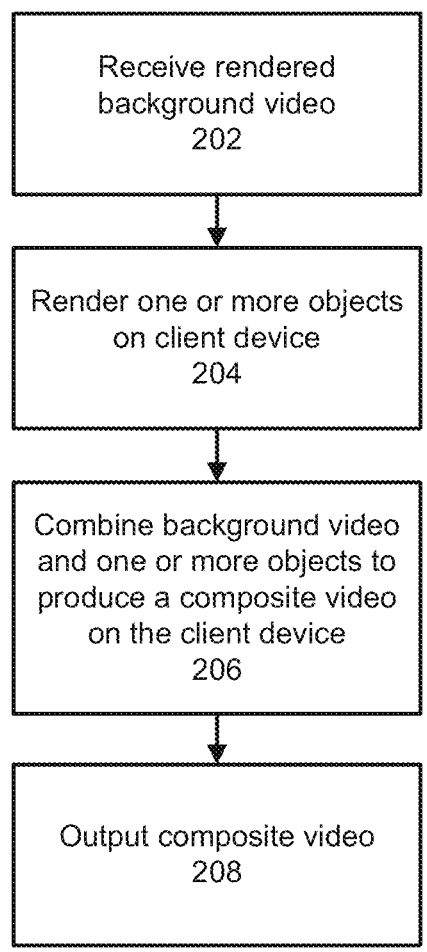
FIG. 2 is a flowchart of an example method for hybrid video streaming in accordance with some implementations.

FIG. 2: Method to Generate Composite Video

FIG. 2 is a flowchart of an example method 200 (e.g., a computer-implemented method) to perform hybrid video streaming, in accordance with some implementations.

Figure 4:
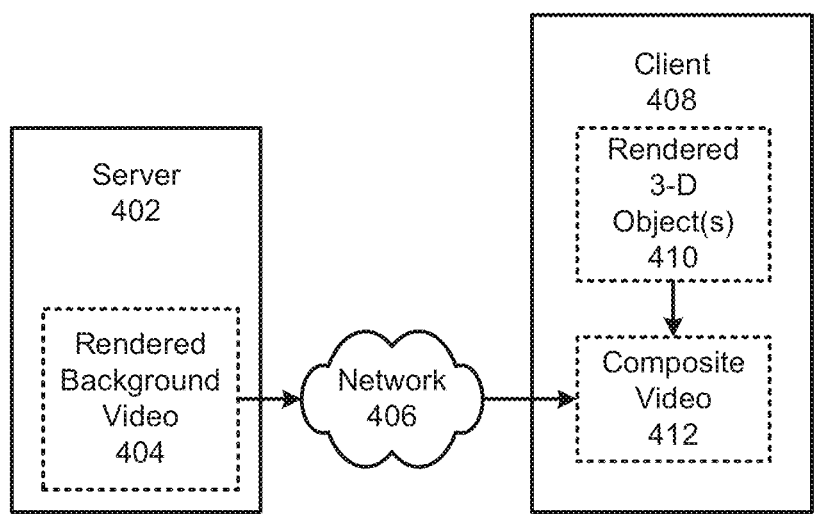
FIG. 4 is a diagram showing background video from a server combined at a client device with one or more three-dimensional objects rendered at the client device in accordance with some implementations.

In some implementations, method 200 can be implemented, for example, on one or more of a server device or a client device, or other device or a combination of devices. In some implementations, some or all of method 200 can be implemented on one or more of devices 102 or 110/118 shown inf FIG. 1, or one or more of devices 402 or 408 as shown in FIG. 4 or 480 as shown in FIG. 4, and/or on both server device(s) and client device(s). In described examples, the implementing system includes one or more digital hardware processors or processing circuitry ("processors"), and one or more storage devices. Method 200 may be performed by a hybrid streaming module (e.g., 115 or 121) executing on a client device. In some implementations, different components of one or more devices or facilities can perform different blocks or other parts of the method 200.

In some implementations, the method 300, or portions of the method, can be initiated automatically by a device. For example, the method (or portions thereof) can be periodically performed or performed based on the occurrence of one or more particular events or conditions. For example, such events or conditions can include a client device executing a videogame, a predetermined time period having expired since the last performance of method 200, and/or one or more other events or conditions occurring which can be specified in settings of a device implementing method 200. In some implementations, such conditions can be previously specified by a user in stored custom preferences of the user (accessible by a device or method with user consent). In some examples, a device (server or client) can perform the method 300 with access to one or more applications. In another example, a server device can send data to a client over a network, and the client can perform method 200 in whole or in part. Method 200 can also be performed using a combination of processing on a server device, one or more client devices, and/or a combination of the above.

Processing begins at 202, where a client device receives background video that corresponds to a background portion of a virtual environment as viewed from a particular vantage point associated with the client device (e.g., a vantage point of a user, game player, or avatar at a particular location in a videogame virtual environment). In some implementations, the background video can include background video rendered on a server as described below in conjunction with FIG. 3. In some implementations, the video can include a view of an environment as seen through the game player's or avatar's point of view (e.g., from a particular vantage point), a panoramic view of the environment at the game player's or avatar's position, or color information to map to geometries in a 3-D scene. In some implementations, the background video can also include supplemental data such as one or more of color map data, depth buffer data or three-dimensional geometry information, which can be used when processing foreground objects to aid in placement and positioning of the foreground objects over the background. Processing continues to 204.

At 204, the client device renders one or more rendered objects that are at least partially in a foreground of the virtual environment. For example, the rendered objects can include one or more objects such as a character, vehicle or other object having a position or orientation controlled by a video game user (or player) associated with the client device. The rendered objects can also include one or more objects having a position or orientation controlled by another video game user different than the user associated with the client device. The rendered objects can also include one or more objects having a position or orientation controlled by the videogame (e.g., computer-controlled objects such as artificial intelligence objects, vehicles, characters, avatars, or the like). Processing continues to 206.

At 206, the client device combines at least a portion of the background video and at least one of the one or more rendered objects into a composite video. The supplemental information described above can include depth information (e.g., depth in geometry). The background and supplemental data can also include a plurality of layers (e.g., layers corresponding to different depths within a 3-D scene). The depth information provided in supplemental data from the server can be used when rendering or combining on the client device.

For example, locally rendered objects (and parts thereof) can have specific depths and positions in a frame of video. The depth can be compared to a depth of objects in the background video to determine whether the locally rendered object is completely in the foreground, partially in the foreground, or occluded by the background. Rendering and/or combining can be adjusted accordingly, e.g., the combined video can use one or more pixel values of the background video or the rendered object based on whether the object pixel is associated with a lower distance (or depth) from the vantage point than the corresponding background video pixels.

The combining (or compositing) can be performed in a variety of ways, including, but not limited to overlaying the client objects on top of (i.e., in the foreground of) the background video, using depth and geometry information to determine what parts of the video are in front or behind the client's objects, or using depth and geometry information to warp the video content to more precisely match the client current viewpoint, and then performing compositing using one of the techniques described above. In some implementations, combining can be performed for each frame on a frame-by-frame basis. By rendering and combining at each frame latency can be minimized. Frames from the server (or platform) may not arrive at the client device at regular intervals or at the same intervals as the rendering and combing is being performed by the client device. Accordingly, the graphics rendered on the client may be combined with a frame from the server that was received prior to the current rendering on the client device (e.g., an older frame). Processing continues to 208.

At 208, the client device outputs the composite video. For example, the client device may output the composite video to a display coupled to the client device or other output device (e.g., external video display device, virtual reality headset, wearable display device, video projector, etc.). The client device can also include virtual reality (VR), augmented reality (AR), or extended reality (XR) capabilities, and the rendering, combining, or outputting functions on the client device may drive or work cooperatively with the VR, AR, or XR systems of the client device.

Blocks 202-208 can be repeated in whole or in part, or the order blocks 202-208 are performed in may vary according to a contemplated hybrid video streaming task.

Figure 3:
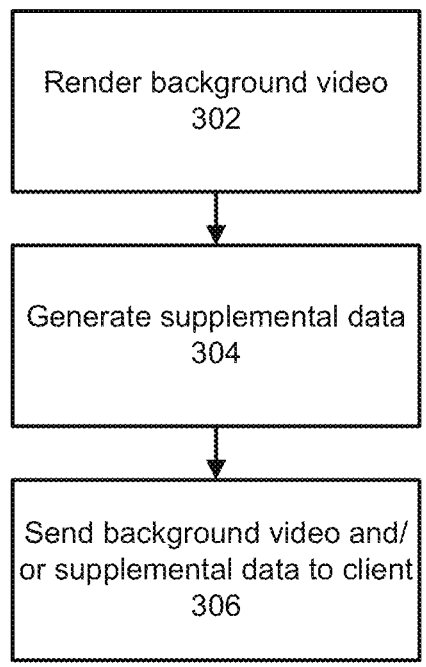
FIG. 3 is a flowchart of a method for providing background video from a server to a client in accordance with some implementations.

FIG. 3: Server Method to Generate Background Video and Supplemental Data

FIG. 3 is a flowchart of an example method 300 (e.g., a computer-implemented method) to provide background video from a server to a client, in accordance with some implementations.

In some implementations, method 300 can be implemented, for example, on one or more of a server device or a client device, or other device or a combination of devices. In some implementations, some or all of method 300 can be implemented on one or more of devices 102 or 110/118 shown inf FIG. 1, or one or more of devices 402 or 408 as shown in FIG. 4 or 480 as shown in FIG. 4, and/or on both server device(s) and client device(s). In described examples, the implementing system includes one or more digital hardware processors or processing circuitry ("processors"), and one or more storage devices. Method 300 may be performed by a hybrid streaming module (e.g., 107) executing on a server or platform system (e.g., 102). In some implementations, different components of one or more devices or facilities can perform different blocks or other parts of the method 300.

In some implementations, the method 300, or portions of the method, can be initiated automatically by a device. For example, the method (or portions thereof) can be periodically performed or performed based on the occurrence of one or more particular events or conditions. For example, such events or conditions can include a client device executing a videogame, a predetermined time period having expired since the last performance of method 300, and/or one or more other events or conditions occurring which can be specified in settings of a device implementing method 300. In some implementations, such conditions can be previously specified by a user in stored custom preferences of the user (accessible by a device or method with user consent). In some examples, a device (server or client) can perform the method 400 with access to one or more applications. In another example, a server device can send data to a client over a network, and the client can perform method 300 in whole or in part. Method 300 can also be performed using a combination of processing on a server device, one or more client devices, and/or a combination of the above.

Processing begins at 302, where the background video is rendered. In some implementations, the server can render a background video including one or more of a view of an environment as seen through the client's point of view (e.g., from a particular vantage point), a panoramic view of the environment around the client's position, or color information to map to geometries in a 3-D scene. The rendering on the server side can be performed using standard rendering techniques or techniques specialized for hybrid streaming as described herein. A particular technique being used can depend on the division of processing between the server device and the client device, which can be based on the factors described above. In some implementations, the server can include other rendering techniques for the hybrid streaming. For example, if the server has information about what the client will render, the server can compute the difference and render only the portions different from what the client will render. In another example, if the server has information that indicates the client has high resolution data for some components of the environment being displayed, the server can skip rendering those portions of the environment and only render portions that may be needed by the client (i.e., the portions of the environment not being rendered by the client in high resolution).

In another example, content decisions can be made on the server. For example, the server can determine that character models are rendered on the client, the server can skip rendering the character models on the server. In some implementations, clients may reuse graphics components that were previously rendered on the server. Reuse of previously rendered objects may work well for more distant objects in the environment as these may look similar at nearby positions.

In some implementations, reuse of renderings of entire objects may not be used, but data used to perform the rendering may be re-used. For example, view-independent portions of an illumination can be computed and shared across all clients on a same map (or environment). Also, computations for level of detail, terrain, procedural effects, etc. can be shared to clients in the same map or environment. In some implementations, the server can evaluate client-specific parameters (e.g., rendering power son the client) to determine how much of the rendering of an environment to perform on the server and how much to delegate to the client.

In general, in some implementations, the server and client can communicate information about the division of rendering responsibility between the server and client so that the server does not send server renderings of portions of the environment that the client is rendering locally. Combining (or compositing) can be performed more efficiently when the client and server coordinate which portions which device will render. Processing continues to 304.

At 304, supplemental data corresponding to the background is optionally generated. In some implementations, the supplemental data can include extra data to inform the client about the geometrical composition of the environment that the background video represents (or is mapped to). The extra data can help the client device more accurately and/or efficiently perform the compositing operation.

The supplemental data can include one or more of depth buffer data or 3-D geometry information. In some imple-mentations, the client may already have a 3-D geometry of the objects and may only need transform matrices to be sent. By sending only transform matrices, the process can be made efficient compared to techniques of sending 3-D geometry data. In some implementations, the client may not require the 3-D geometry data to be sent from the server, but rather only enough geometry data to do perform reprojection and/or compositing operations. The server may compute a minimum amount of geometry data needed to perform reprojection and/or compositing operations, thus reducing the amount of data needed to be computed and transferred by the server. Processing continues to 306.

At 306, the server sends the background video and, optionally, the supplemental data, to the client. For example, the gaming platform 102 may send the background video and/or supplemental data to the game application 112 on the user device 110.

FIG. 4: Client-Server System for Video Generation

FIG. 4 is a diagram showing a server 402 (e.g., gaming platform 102) having rendered background video 404 and sending the rendered background video 404 to a client device 408 (e.g., client device 110 and/or 118) via a network 406. The client device 408 renders one or more objects 410 (e.g., three-dimensional objects) and combines the one or more objects 410 with the rendered background video 404 to produce a composite video 412. The client device 408 may display the composite video in a user interface on a screen of the client device, e.g., a LED screen, a projector controlled by the client device, etc.

In some implementations, the server 402 is configured to efficiently stream (or render, or display) videogame video (or other interactive media) to one or more client devices 408. The techniques described herein can provide improved responsiveness compared to the responsiveness typically obtainable with conventional, simple video streaming. Also, the techniques disclosed herein can provide a higher quality video output using less computational resource demands (e.g., processor cycles and/or memory) compared to the quality and computational resource demands that can be obtained by conventional techniques of simply rendering 3-D scenes entirely on client devices. For example, foreground objects that are locally rendered may respond instantly (or near instantly) to user input (e.g., move left, up, or down, tilt, etc.) because of local computation while corresponding background is automatically received from the server where a small delay in background is acceptable because small changes in perspective due to movement can be buffered at the client.

Also, performing background rendering on the server may help save client-side resources, which may be scarce (e.g., lower processing capacity of mobile devices, limited memory, limited battery power, etc.).

Some implementations permit conversion of traditional (e.g., console) video games to mobile games easier by lowering the storage and computational requirements. Some implementations can include composition of a server-side stream (e.g., the background video) on a server, which may lag (e.g., due to network latency), but is powerful enough to perform demanding rendering operations (e.g., rendering of large sections of the video, such as the background), and combining the server-side stream with on-device rendered 3-D objects, which have may have rendering limitations (e.g., processor throughput and/or memory) but may have little or no lag (e.g., lag due to network latency).

In some implementations, client scene data is also streamed, which can help client performance and resource utilization because the client doesn't need to have data for everything the client might ever render locally. In general, implementations can include a division of server processing and client processing that provides a compromise between client power versus network bandwidth. Multiple divisions of server and client processing are possible depending on a contemplated compromise between client power and network bandwidth.

In some implementations, the division of processing between server and client (e.g., how much video is rendered on the server and transmitted to the client) can be determined based on the client processing resources available and network bandwidth. For example, if the client has limited processing resources, but the network connection is fast (e.g., has high bandwidth and low latency), the system may render as much as possible on the server and stream the rendered video to the client over the fast network connection. In another example, if the client has sufficient processing resources (e.g., to render the foreground and at least some of the background), but the network connection is relatively slow, the system may render less on the server and shift more processing to the client to reduce the amount of data required to be transmitted over the network.

In general, more local rendering can be good for situations having relatively powerful clients and relatively weak network connections. If network bandwidth is available, the server may spend more processing rendering the background video, in exchange for rendering less on the client. For example, by providing background video having multiple layers of panoramic images. The separation of the background video stream into layers, each assigned to a different distance, permits parallax effects and can look realistic even objects are rendered closer to the camera (or point of view) in the video stream.

In some implementations, factors that can be evaluated to determine a division of the hybrid streaming functions between the server and the client device can include: how much network bandwidth can be dedicated to the video, how much processing power is available for rendering on the client device, or how much data can be stored on the client device. For example, in a situation where high client processing power is available and low network bandwidth is available, the system may render background and foreground objects locally (i.e., on the client device). For example, in situations where high client processing power and high network bandwidth are available, the background can be rendered on the server, and the foreground objects can be rendered locally and combined with the background.

In another example situation, where low client power is available and low network bandwidth is available, both background and foreground can be rendered at lower quality locally and the server can provide rendering based on avail network bandwidth. In still another example situation, where low client power is available and high network bandwidth is available, more rendering can be performed on the server, and the client device can be used to render only main foreground objects locally.

Example Implementation 1

FIGS. 5 and 6: Example Video

Figure 5A:
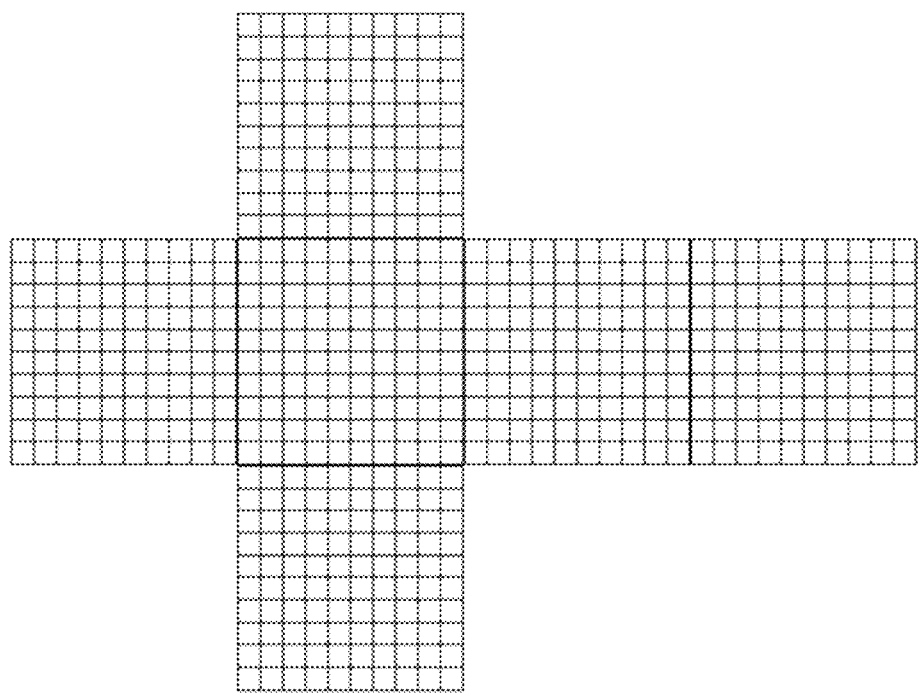
FIGS. 5A and 5B show views of types of panoramic scene distribution formats accordance with some implementations.
Figure 5B:
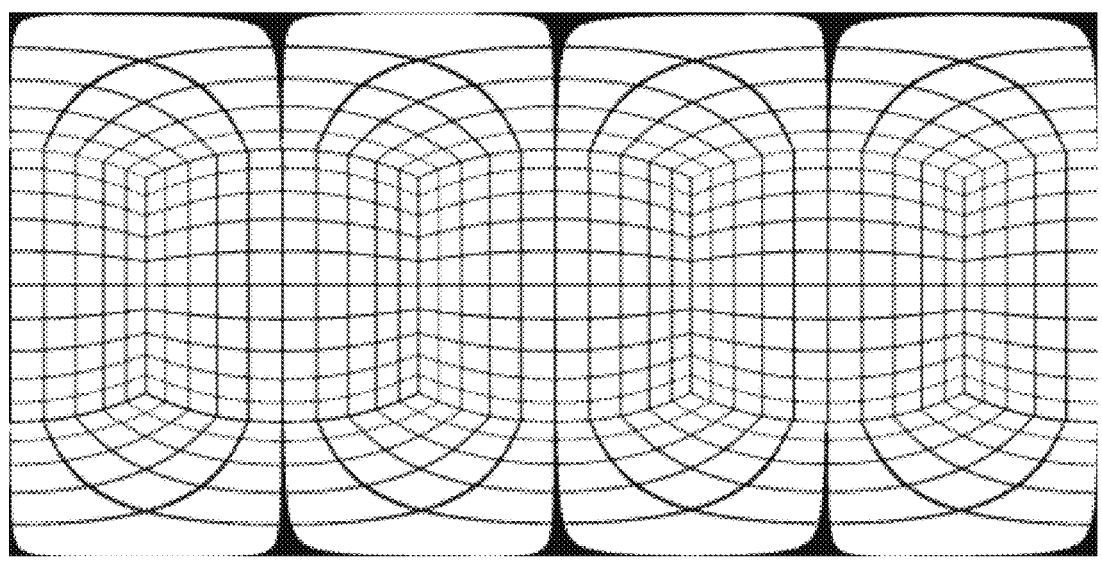

In some implementations, one technique for hybrid streaming includes streaming a panoramic video of a far scene (or background). Panoramic scenes can be distributed in a variety of formats including horizontal cross or cubic format (as shown in FIG. 5A), latitude/longitude format (as shown in FIG. 5B) On the client side, the client renders the panoramic scene from the current point-of view (based on the panoramic scene format) and combines the video with 3-D objects, e.g., by overlaying the 3-D objects on the panoramic scene background.

Figure 6A:
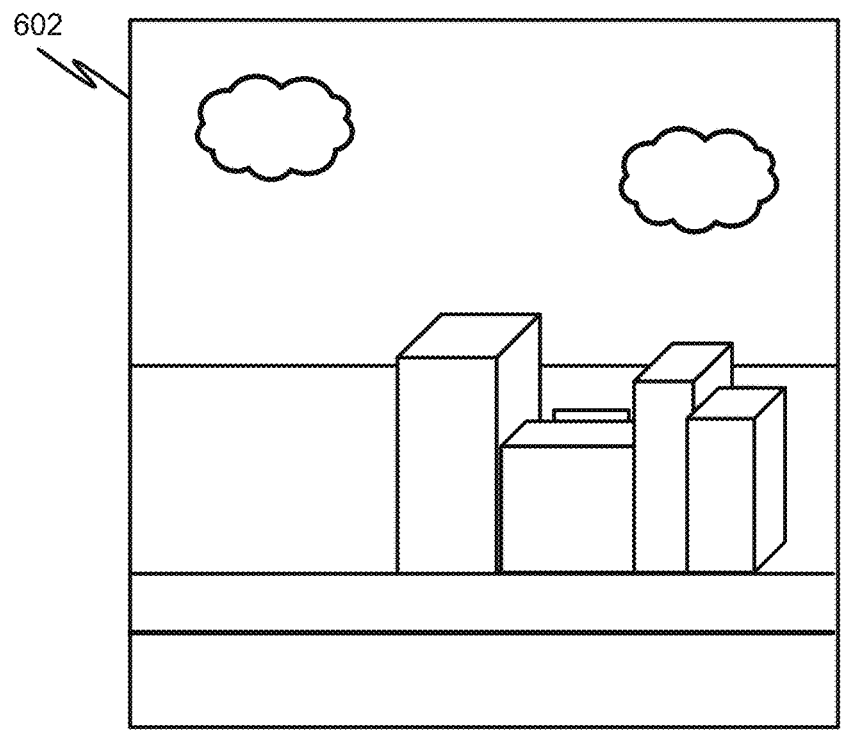
FIG. 6A shows a background video frame rendered on a server device from a current point of view of the client device in accordance with some implementations.
Figure 6B:
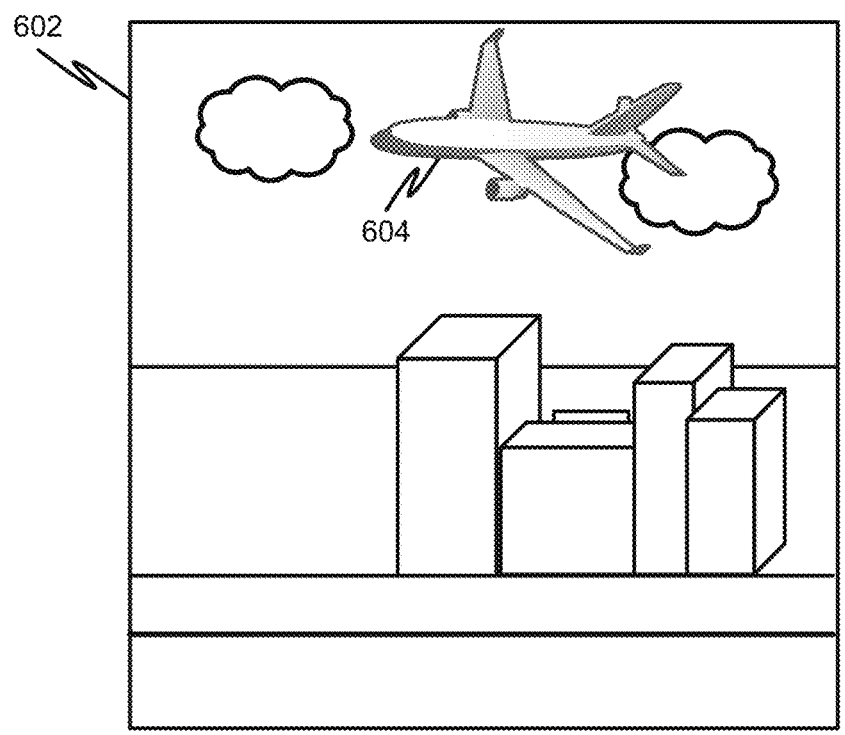
FIG. 6B shows a video frame a three-dimensional object rendered at a client and combined with the background frame of FIG. 6A in accordance with some implementations.

FIG. 6A shows a background video frame 602 (e.g., a still 2-d image) rendered from a panoramic video (e.g., in one of the formats shown in FIG. 5A or 5B) on a client device from a current point of view of the client device in accordance with some implementations. FIG. 6B shows the background video frame of FIG. 6A combined with an object 604 (e.g., a three-dimensional object) rendered at a client and combined with the background frame of FIG. 6A.

This technique can be effective because the panoramic video can be warped to the current view. The warping can accommodate for camera rotation. Also, translation may not be a significant issue for very far objects. This technique may also stream efficiently because most bits in video streams are used on disocclusions, which don't happen if significant parallax is not present (e.g., when most objects are far objects). This technique may be well suited to a video stream having objects relatively far off in the background of the scene. With this technique, there is still a significant amount of rendering performed locally (i.e., on the client device).

This technique can be effective in situations where a relatively powerful client device is coupled to a relatively weak network connection. This technique can be adjusted to devote more bandwidth to the background video, in exchange for rendering less on the client, by providing multiple layers of panoramic images as the background. The separation of the video stream into layers, each assigned to a different distance, permits parallax effects and thus will look realistic even for rendering objects closer to the camera in the video stream.

Example Implementation 2

FIGS. 7 and 8: Example Video

For streaming objects closer to the camera, a different technique can be used that allocates more network bandwidth to the video to get more information for correct warping and compositing. For example, if a video includes depth information, the depth information can be used for rendering on the server or client sides.

Figure 7A:
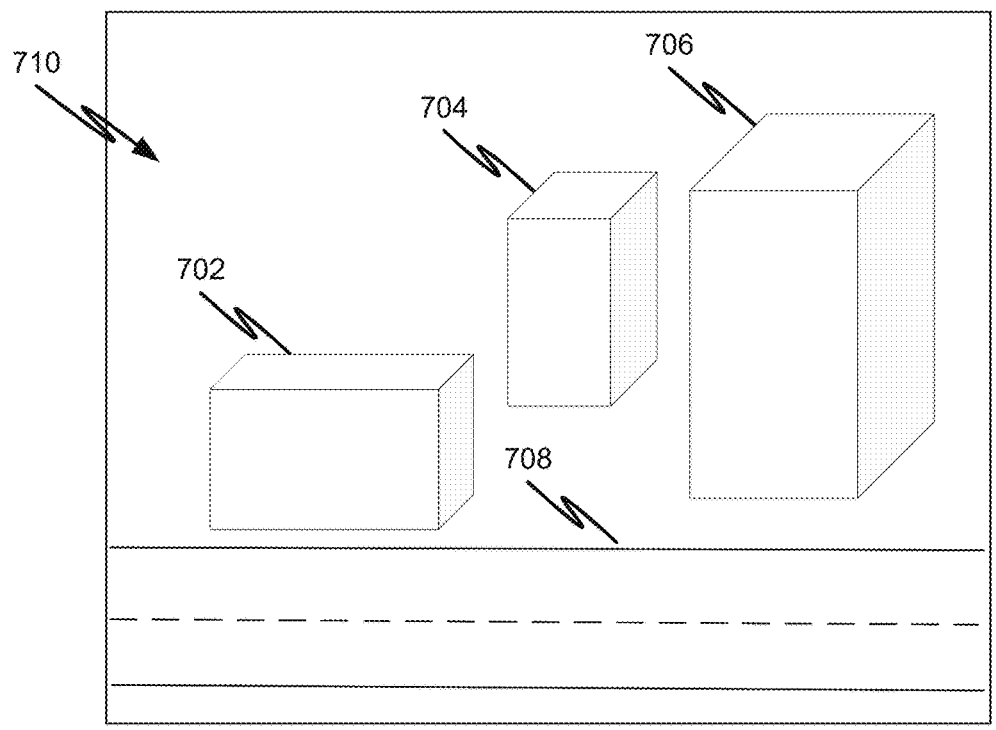
FIGS. 7A and 7B show a video frame and corresponding depth map, respectively, in accordance with some implementations.
Figure 7B:
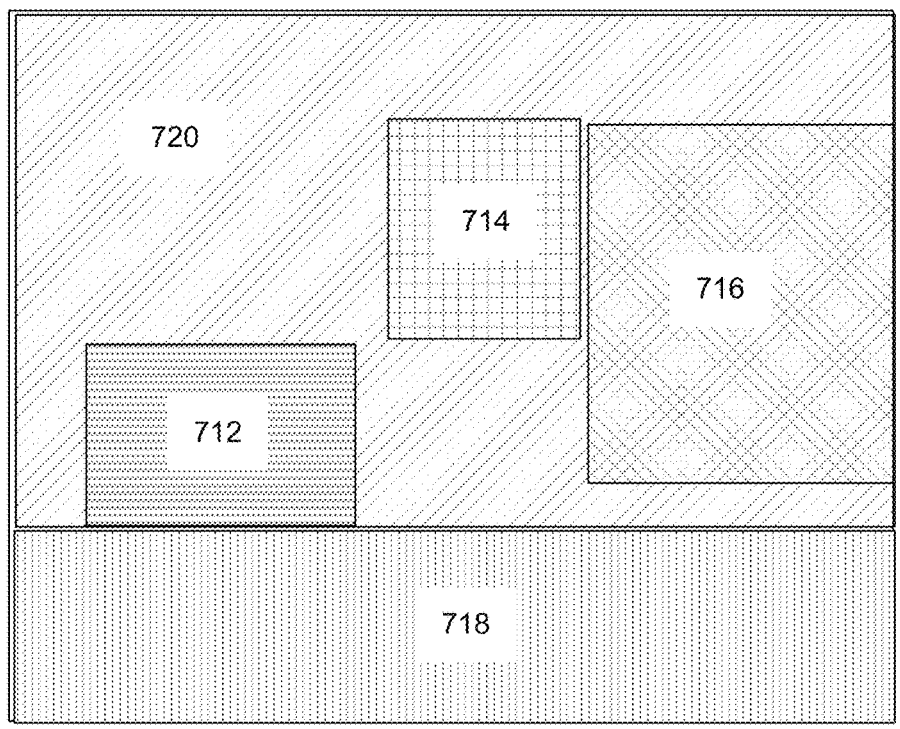

FIGS. 7A and 7B show a video frame and corresponding depth map, respectively. FIG. 7A is a diagram of a simple scene for illustration purposes. The scene includes three structures 702, 704, and 706, a road 708, and a background portion 710. These features of the scene have corresponding depth information as shown in FIG. 7B. The depth information can include a first depth 712 corresponding to structure 702, a second depth 714 corresponding to structure 704, a third depth 716 corresponding to a structure 706, a fourth depth 718 corresponding to road 708, and a fifth depth 720 corresponding to the background portion 710.

The depth information can be used to determine where objects in the video should be at a novel camera position. This depth information can then also be used to do proper compositing with the client-generated 3-D graphics, by indicating what objects should end up in front and what should end up behind the video scene. The depth can be streamed with the video, or it can be already on-device, and can include a coarse representation of the 3-D geometry of the entire scene stored in the client device at all times. The depth information can include a depth map or a set of 3-D objects onto which the video is mapped (e.g., for use in a projection mapping style technique).

Figure 8A:
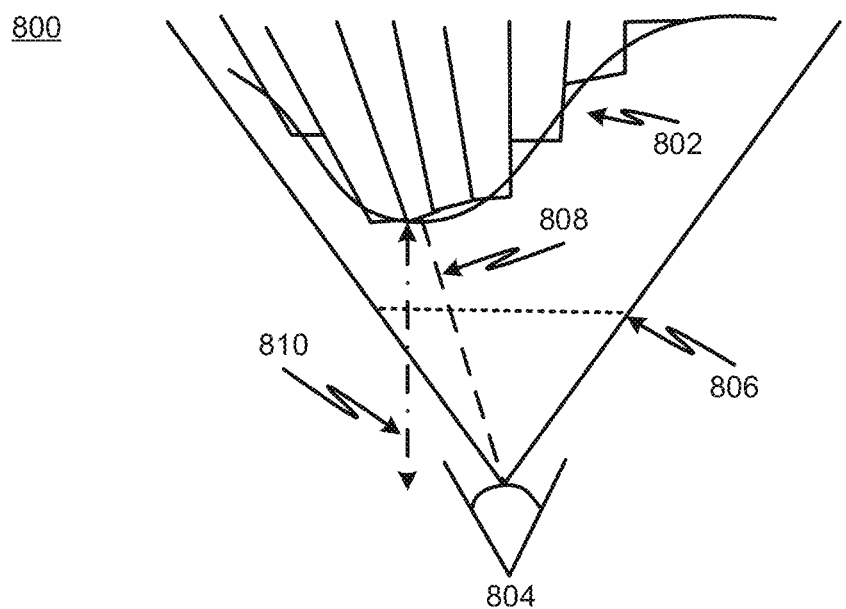
FIGS. 8A and 8B show depth-based view projection and re-projection, respectively, in accordance with some implementations.

FIG. 8A shows a diagram of a top-down visualization 800 of depth information 802 for pixels in a row (or portion of a row) of an image 806. The depth information can include a depth value for each pixel in an image (e.g., a background scene or panoramic scene). The depth 810 represents the distance 810 from a particular pixel mapped along a line 808 to the camera 804.

Figure 8B:
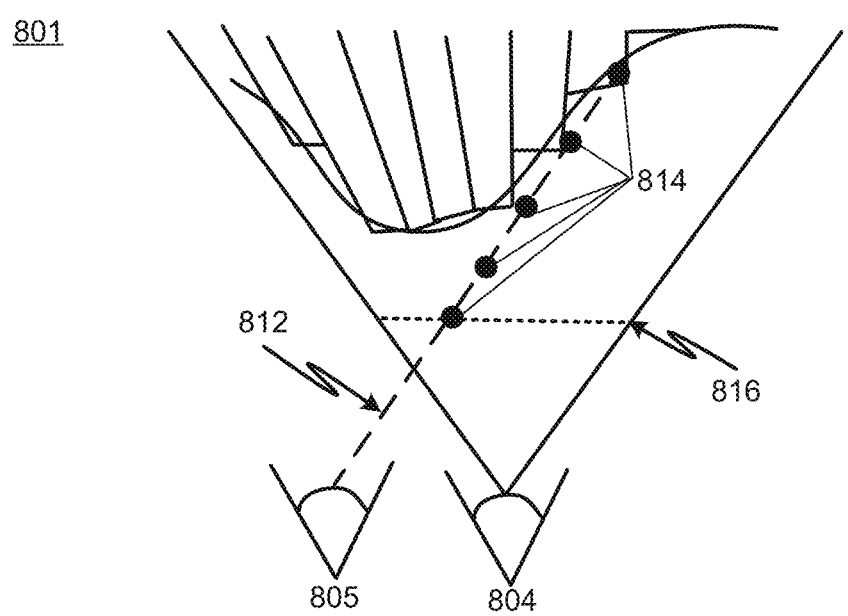

FIG. 8B shows a diagram of a depth-based viewed reprojection 801, in which an image 816 is reprojected based on a new camera position 805. In some implementations, the reprojected image can be generated by sampling the depth information at the position of the new image 816. A sampling technique can include moving iteratively along a ray 812, where the iterations are shown as dots 814, to reach the new image 816 distance.

In some implementations, on a high-powered client (e.g., a client having processing and/or memory resources above respective thresholds) there may be little or no reason to use a hybrid streaming technique. However, when the client device has insufficient memory, compute, and/or GPU resources available, the hybrid streaming techniques described herein can be beneficial to performance and ability to process a videogame. In some implementations, a client may have insufficient memory to store the entire game environment. Also, in some implementations, the server may have high resolution data while the client only has low resolution, and the client may be missing some content entirely.

In some implementations, the partitioning (or division) of video stream processing between the client and the server may change dynamically based on one or more of memory (at the client or server), bandwidth (at the client or server), power (at the client or server), etc. Some implementations can include a dynamic trade-off of what to stream to the client in an already-computed, final form and what to have the client compute from (streamed) source data. Client/network spec will/can be used to determine the balance.

Hybrid streaming may require more server CPU resources, GPU resources, and/or bandwidth resources, so an operator of the gaming platform may charge more for this feature. In some implementations, the amount of server computation can be linked to some form of payment, e.g., a system may stream an "HD" version for premium customers. Also, because hybrid streaming is linked to the notion of being able to jump into an online videogame experience quickly, when a user first joins a game/world, the user can get more video streaming (e.g., to reduce a need to have as many local assets) and as the asset streaming progresses (e.g., after the user has spent some time in the virtual world) the system may move some things to the local client for rendering.

In some implementations, the balance between what to stream as video, and what to do locally on the client device can depend on which items are latency sensitive. For example, any dynamic object that is important to the gameplay should be rendered locally. In some implementations, developers may tag these for local rendering only.

In some implementations, when a mobile client temporarily loses connectivity, the system can continue to render from previously received data, but visual artifacts may appear and/or get worse over time. For example, holes may appear due to areas which weren't rendered in the stale data but are now visible. Hole filling and other prediction techniques can be used to help reduce the artifacts.

In some implementations, the system can be configured to adapt dynamically to network conditions and perform more operations on the client device when network bandwidth is constrained, and to perform more operations on the server device when a high-quality network exists.

In some implementations, the hybrid streaming system including the client and server can be configured such that each of the client and server maintains data on viewing parameters and keeps geometric information in sync. In some implementations, transitioning can be focused on smoothing out rendering differences to help reduce jarring transitions between local and remote components.

In some implementations, clients can have an approximation to the full lighting information available on the server. For example, clients will likely know the dominant light sources and may compute less accurate lighting and shadows compared to more complete rendering on the server. Clients may need to have enough information to render the objects under their responsibility to a quality level that is similar to the quality level of the server rendering. Lighting and/or rendering information (e.g., assets, textures, or lighting) can be streamed from the server only for what they need, so it's a subset of the entire game world. In some implementations, systems can be computed on the server globally for the entire world, but also or alternatively on the client only for things around a given player.

In some implementations, the video game may provide a variety of hints on what things are important or not at any given time. The changing importance of things can change streaming quality in terms of how much bandwidth to dedicate to streaming given parts of the scene.

In some implementations, clients with similar viewpoints can share or reuse streams that have already been computed. In some implementations, renderings performed on servers can be shared. For example, lighting and/or shadows and other effects can be computed in a view-independent way and reused to create specific images for the different client views. Some implementations can include amortization of computation across different clients.

In some implementations, client-side input, along with physics simulation from the server and clients, can be used to determine the viewing parameters for the client. The server rendered data is re-rendered or warped for the client viewing parameters, and composited (or combined) with any client-side rendering. In some implementations, the server may always "lag behind" the client in terms of where the client is looking, that's why client-side there will be provisions to "warp" server-sent data (video streams) to accommodate for that disparity and provide a lag-free client view.

Figure 9:
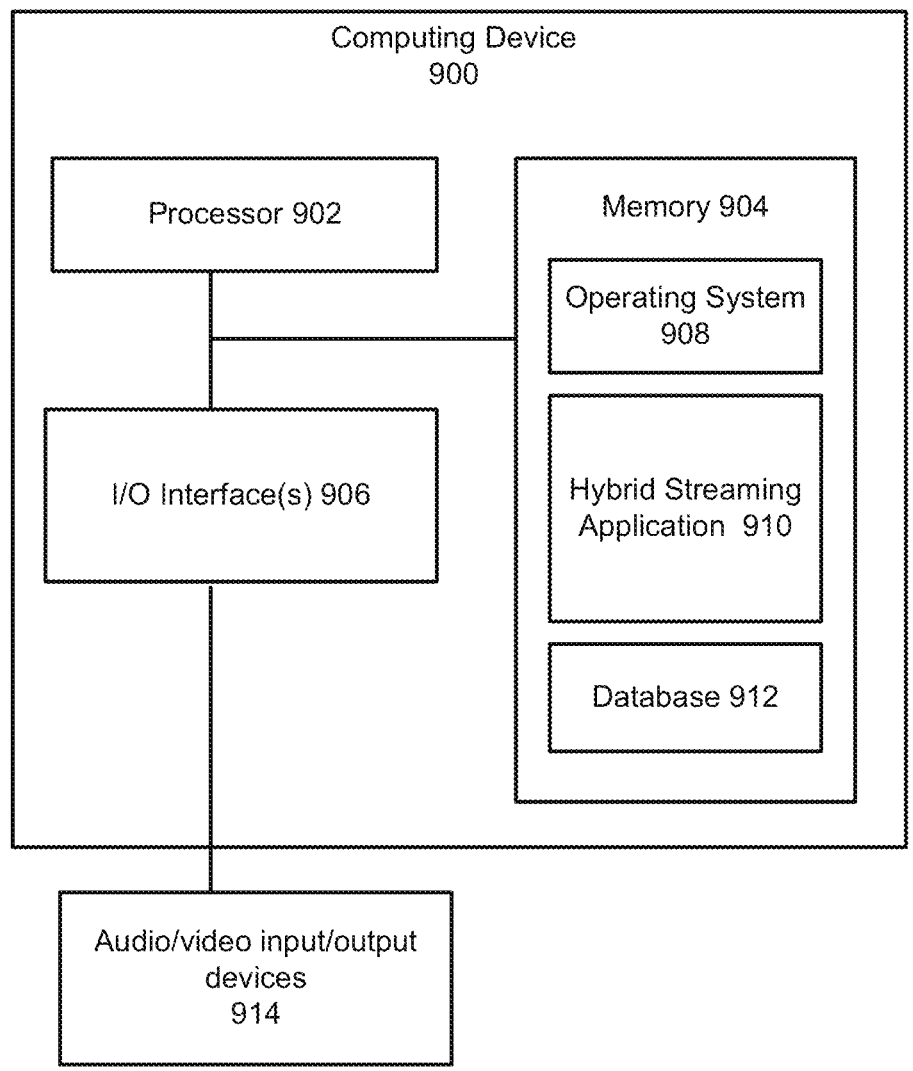
FIG. 9 is a block diagram illustrating an exemplary computing device in accordance with some implementations.

FIG. 9: Example Computing Device

FIG. 9 is a block diagram of an example computing device 900 which may be used to implement one or more features described herein. The client devices 110 and 118 and/or the gaming platform 102 of FIG. 1 may be provided in the form of the computing device 900 of FIG. 9. In one example, device 900 may be used to implement a computer device, (e.g., 102, 110, and/or 118 of FIG. 1), and to perform appropriate method implementations described herein. Computing device 900 can be any suitable computer system, server, or other electronic or hardware device. For example, the computing device 900 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 900 includes a processor 902, a memory 906, input/output (I/O) interface 906, and audio/video input/output devices 914.

Processor 902 can be one or more processors and/or processing circuits to execute program code and control basic operations of the device 900. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in device 900 for access by the processor 902, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 902 and/or integrated therewith. Memory 904 can store software operating on the server device 900 by the processor 902, including an operating system 908, one or more applications 910, e.g., a hybrid video streaming application and application data 912. In some implementations, application 910 can include instructions that enable processor 902 to perform the functions described herein, e.g., some or all of the methods of FIG. 3 or 4, or example implementations 1 or 2 described above.

For example, applications 910 can include an audio spatialization module 912, which as described herein can provide audio spatialization within an online gaming platform (e.g., 102). Any of software in memory 904 can alternatively be stored on any other suitable storage location or computer-readable medium. In addition, memory 904 (and/or other connected storage device(s)) can store instructions and data used in the features described herein. Memory 904 and any other type of storage (magnetic disk, optical disk, magnetic tape, or other tangible media) can be considered "storage" or "storage devices."

I/O interface 906 can provide functions to enable interfacing the server device 900 with other systems and devices. For example, network communication devices, storage devices (e.g., memory and/or data store 108), and input/output devices can communicate via interface 906. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 914 can include an audio input device (e.g., a microphone, etc.) that can be used to receive audio messages as input, an audio output device (e.g., speakers, headphones, etc.) and/or a display device, that can be used to provide graphical and visual output such as the combined video output of step 308 of FIG. 3.

For ease of illustration, FIG. 9 shows one block for each of processor 902, memory 904, I/O interface 906, and software blocks 908 and 910. These blocks may represent one or more processors or processing circuitries, operating systems, memories, I/O interfaces, applications, and/or software modules. In other implementations, device 900 may not have all of the components shown and/or may have other elements including other types of elements instead of, or in addition to, those shown herein. While the online gaming platform 102 is described as performing operations as described in some implementations herein, any suitable component or combination of components of online gaming platform 102 or similar system, or any suitable processor or processors associated with such a system, may perform the operations described.

A user (or client) device can also implement and/or be used with features described herein. Example user devices can be computer devices including some similar components as the device 900, e.g., processor(s) 902, memory 904, and I/O interface 906. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 914, for example, can be connected to (or included in) the device 900 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., one or more steps of methods 300 or 400) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A method comprising:
   receiving, at a client device, background video that corresponds to a background portion of a virtual environment as viewed from a single vantage point associated with the client device, wherein the background video is rendered on a server;
   rendering, using the client device, one or more rendered objects that are at least partially in a foreground portion of the virtual environment, wherein the one or more rendered objects include at least one three-dimensional (3D) object having a position or orientation controlled by a video game user of the client device;
   determining, using depth and geometry information, portions of the background video that are in front of the one or more rendered objects or behind the one or more rendered objects;
   warping the background video to more precisely match the single vantage point associated with the client device;
   combining, using the client device, at least a portion of the warped background video and at least one of the one or more rendered objects into a composite video that matches the single vantage point associated with the client device; and
   outputting the composite video.

2. The method of claim 1, wherein the background video includes a panoramic view of the virtual environment at a position of the single vantage point associated with the client device.

3. The method of claim 1, wherein the background video includes color map information to map a three-dimensional scene.

4. The method of claim 1, further comprising receiving, from the server, supplemental data corresponding to the background video.

5. The method of claim 4, wherein the supplemental data includes data from one or more of depth buffers or three-dimensional geometry information.

6. The method of claim 1, wherein the combining includes overlaying the one or more rendered objects on top of the warped background video.

7. The method of claim 1, wherein the combining includes generating a parallax effect using a plurality of layers of panoramic images corresponding to respective different distances.

8. The method of claim 1, wherein generating the composite video includes using depth information to determine placement of the one or more rendered objects relative to one or more locations in the warped background video.

9. A client device to perform hybrid video streaming, the client device comprising:
   one or more processors; and
   a memory coupled to the one or more processors, with instructions stored thereon that, when executed by the one or more processors to perform operations comprising:
   receiving background video that corresponds to a background portion of a virtual environment as viewed from a single vantage point associated with the client device, wherein the background video is rendered on a server;
   rendering one or more rendered objects that are at least partially in a foreground of the virtual environment, wherein the one or more rendered objects include at least one three-dimensional (3D) object having a position or orientation controlled by a video game user of the client device;
   determining, using depth and geometry information, portions of the background video that are in front of the one or more rendered objects or behind the one or more rendered objects;
   warping the background video to more precisely match the single vantage point associated with the client device;
   combining at least a portion of the warped background video and at least one of the one or more rendered objects into a composite video that matches the single vantage point associated with the client device; and
   outputting the composite video.

10. The client device of claim 9, wherein the background video includes a panoramic view of the virtual environment at a position of the particular single vantage point associated with the client device.

11. The client device of claim 9, wherein the background video includes color map information to map a three-dimensional scene.

12. The client device of claim 9, wherein the operations further comprise receiving, from the server, supplemental data corresponding to the background video, wherein the supplemental data includes data from one or more of depth buffers or three-dimensional geometry information.

13. The client device of claim 9, wherein the combining includes overlaying the one or more rendered objects on top of the warped background video.

14. The client device of claim 9, wherein generating the composite video includes using depth information to determine placement of the one or more rendered objects relative to one or more locations in the background video.

15. A non-transitory computer-readable medium comprising instructions that, responsive to execution by a processing device, cause the processing device to perform operations comprising:
   receiving, at a client device, background video that corresponds to a background portion of a virtual environment as viewed from a single vantage point associated with the client device, wherein the background video is rendered on a server;
   rendering, using the client device, one or more rendered objects that are at least partially in a foreground of the virtual environment, wherein the one or more rendered objects include at least one three-dimensional (3D) object having a position or orientation controlled by a video game user of the client device;

determining, using depth and geometry information, portions of the background video that are in front of the one or more rendered objects or behind the one or more rendered objects;

warping the background video to more precisely match the single vantage point associated with the client device;

combining, using the client device, at least a portion of the background video and at least one of the one or more rendered objects into a composite video that matches the single vantage point associated with the client device; and outputting the composite video.

16. The non-transitory computer-readable medium of claim 15, wherein the background video includes a panoramic view of the virtual environment near a position of the single vantage point associated with the client device.

17. The non-transitory computer-readable medium of claim 15, wherein the background video includes color map information to map a three-dimensional scene.

18. The non-transitory computer-readable medium of claim 15, wherein the operations further comprise receiving, from the server, supplemental data corresponding to the background video, wherein the supplemental data includes data from one or more of depth buffers or three-dimensional geometry information, wherein the combining includes overlaying the rendered one or more objects on top of the warped background video.

\* \* \* \* \*